United States Patent
Sorin et al.

(10) Patent No.: US 10,820,071 B2
(45) Date of Patent: Oct. 27, 2020

(54) RECONFIGURABLE INTERCONNECTED NODES

(71) Applicant: Hewlett Packard Enterprise Development LP, Houston, TX (US)

(72) Inventors: Wayne Sorin, Mountain View, CA (US); Joaquin Matres, Palo Alto, CA (US); Michael Tan, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/695,802

(22) Filed: Nov. 26, 2019

(65) Prior Publication Data

US 2020/0100002 A1 Mar. 26, 2020

Related U.S. Application Data

(63) Continuation-in-part of application No. 15/752,243, filed as application No. PCT/US2015/045091 on Aug. 13, 2015, now Pat. No. 10,505,659.

(51) Int. Cl.
*H04Q 11/00* (2006.01)
*G02B 6/35* (2006.01)
(Continued)

(52) U.S. Cl.
CPC ....... *H04Q 11/0005* (2013.01); *G02B 6/3546* (2013.01); *G02B 6/3556* (2013.01);
(Continued)

(58) Field of Classification Search
None
See application file for complete search history.

(56) References Cited

U.S. PATENT DOCUMENTS 4,763,969 A * 8/1988 Khoe .................. G02B 6/2706
 385/36
6,768,827 B2 7/2004 Yoo
(Continued)

FOREIGN PATENT DOCUMENTS

EP 1309118 A1 5/2003
EP 2390971 A2 11/2011
(Continued)

OTHER PUBLICATIONS

Extended European Search Report received for EP Patent Application No. 15901154.3, dated Oct. 22, 2018, 12 pages.
(Continued)

*Primary Examiner* — Darren E Wolf
(74) *Attorney, Agent, or Firm* — Sheppard Mullin Richter & Hampton LLP

(57) ABSTRACT

In the examples provided herein, a system has a plurality of arrayed waveguide gratings (AWG) having a plurality of input ports and a plurality of output ports. A signal within a given wavelength channel transmitted to one of the input ports of a given AWG is routed to one of the output ports of the given AWG based on a signal wavelength. The system also has a plurality of nodes, with each node comprising a set of components for each AWG that the node is coupled to. Each set of components comprises a plurality of optical transmitters, where each optical transmitter is tunable over multiple wavelength channels within a different wavelength band; a band multiplexer to multiplex the multiple wavelength channels within each different wavelength band; and a first output fiber to couple an output of the band multiplexer to one of the input ports of a first AWG.

10 Claims, 13 Drawing Sheets

(51) Int. Cl.
*H04B 10/40* (2013.01)
*H04B 10/50* (2013.01)
*H04B 10/60* (2013.01)

(52) U.S. Cl.
CPC ......... *H04Q 11/0062* (2013.01); *H04B 10/40* (2013.01); *H04B 10/50* (2013.01); *H04B 10/60* (2013.01); *H04Q 2011/0016* (2013.01); *H04Q 2011/0018* (2013.01); *H04Q 2011/0022* (2013.01); *H04Q 2011/0052* (2013.01); *H04Q 2011/0081* (2013.01)

(56) References Cited

U.S. PATENT DOCUMENTS

| | | | |
|---|---|---|---|
| 7,298,974 B2 | 11/2007 | Tanobe et al. | |
| 7,424,223 B1 | 9/2008 | Lundquist et al. | |
| 8,032,023 B2 | 10/2011 | Rasras et al. | |
| 8,447,182 B2 | 5/2013 | Bouda et al. | |
| 8,831,051 B2 | 9/2014 | Liu et al. | |
| 2002/0064191 A1* | 5/2002 | Capewell | G02B 6/29367 372/14 |
| 2007/0237177 A1 | 10/2007 | Endo et al. | |
| 2009/0297162 A1 | 12/2009 | Kai et al. | |
| 2010/0226649 A1 | 9/2010 | Cheng et al. | |
| 2011/0135305 A1 | 6/2011 | Barnard | |
| 2012/0099863 A1 | 4/2012 | Xu et al. | |
| 2012/0219292 A1 | 8/2012 | Graham et al. | |
| 2012/0328292 A1 | 12/2012 | Testa et al. | |
| 2013/0183039 A1 | 7/2013 | Hood et al. | |
| 2013/0302029 A1 | 11/2013 | Lee et al. | |
| 2014/0003810 A1 | 1/2014 | Dong et al. | |
| 2014/0328591 A1 | 11/2014 | Koch et al. | |
| 2014/0341574 A1 | 11/2014 | Yan | |
| 2015/0010305 A1 | 1/2015 | Effenberger et al. | |

FOREIGN PATENT DOCUMENTS

| | | |
|---|---|---|
| WO | 2008/119557 A2 | 10/2008 |
| WO | 2014/120203 A1 | 8/2014 |
| WO | 2014/175835 A1 | 10/2014 |
| WO | 2016/148717 A1 | 9/2016 |

OTHER PUBLICATIONS

Gringeri et al., "Extending Software Defined Network Principles to Include Optical Transport," IEEE Communications Magazine, Mar. 2013, 9 pages.

Qiu et al., "A Cost-Effective Scheme of High-Radix Optical Burst Switch Based on Fast Tunable Lasers and Cyclic AWG", OFC/NFOEC Technical Digest © 2012 OSA, Jan. 23, 2012, pp. 1-3.

Search Report & Written Opinion received for PCT Application No. PCT/US2015/021412, dated Dec. 15, 2015, 12 pages.

Search Report and Written Opinion received for PCT Application No. PCT/US2015/045091, dated May 13, 2016, 11 pages.

* cited by examiner

RECONFIGURABLE INTERCONNECTED NODES

CROSS-REFERENCE TO RELATED APPLICATIONS

This application claims priority to U.S. patent application Ser. No. 15/752,243, which was filed on Feb. 12, 2018, which is based on Application No. PCT/US2015/045091 filed on Aug. 13, 2015, which is herein included by reference in its entirety for all purposes.

BACKGROUND

A data center is a facility that stores, manages, and disseminates data using bandwidth-intensive devices, such as servers, storage devices, and backup devices. Traffic demands in data centers is ever increasing, leading to upgrading of switches inside the data center to higher speeds to serve the growing demand. However, the bandwidth-intensive devices in data centers are interconnected with optical cables, and physically changing the connections between devices can be slow, costly, and error-prone.

BRIEF DESCRIPTION OF THE DRAWINGS

The accompanying drawings illustrate various examples of the principles described below. The examples and drawings are illustrative rather than limiting.

DETAILED DESCRIPTION

A system of reconfigurable interconnected nodes includes reconfigurable photonic switches based upon an arrayed waveguide grating (AWG) that allow connections between nodes of the system to be reestablished dynamically without physically changing connections in the system. The input ports and output ports of a given AWG are coupled to specific transceiver nodes. Tunable transmitters are used in the transceiver nodes to change the emitted wavelength of a signal, and the connected AWG automatically routes the signal to a particular output port of the AWG based on the wavelength of the signal. The system of reconfigurable interconnected nodes can have multiple dimensions, where the number of dimensions of the system corresponds to the number of different AWGs to which each node in the system is connected. A controller may be used to configure the connections dynamically via software commands sent to the tunable transmitters to change the emitted wavelength.

An AWG may be an M×N port device, where M is the number of input ports and N is the number of output ports. Light at different wavelengths entering each of the input ports may be demultiplexed into different output ports. When the AWG is operated in the reverse direction, light entering the output ports may be multiplexed and exit through the input ports.

An AWG operates based upon constructive and destructive interference. Light entering one of the input ports is coupled into a first cavity, and then the light from the first cavity is coupled to one end of an array of waveguides. The length of each waveguide in the array increases across the array, such that the optical path length difference between neighboring waveguides introduces wavelength-dependent phase delays. The other end of the array of waveguides is coupled to a second cavity, and light from the second cavity is coupled to the output ports of the AWG via a series of waveguides. Constructive interference occurs when the optical path length difference of the array of waveguides is equal to an integer number of wavelengths. As a result, different wavelengths of light are focused by the AWG into different ones of the output ports. The AWG has a free spectral range (FSR) that characterizes the periodicity of the demultiplexer. The periodic property arises because constructive interference at the output ports can arise for wavelengths that are spaced by a free spectral range.

Figure 1A:
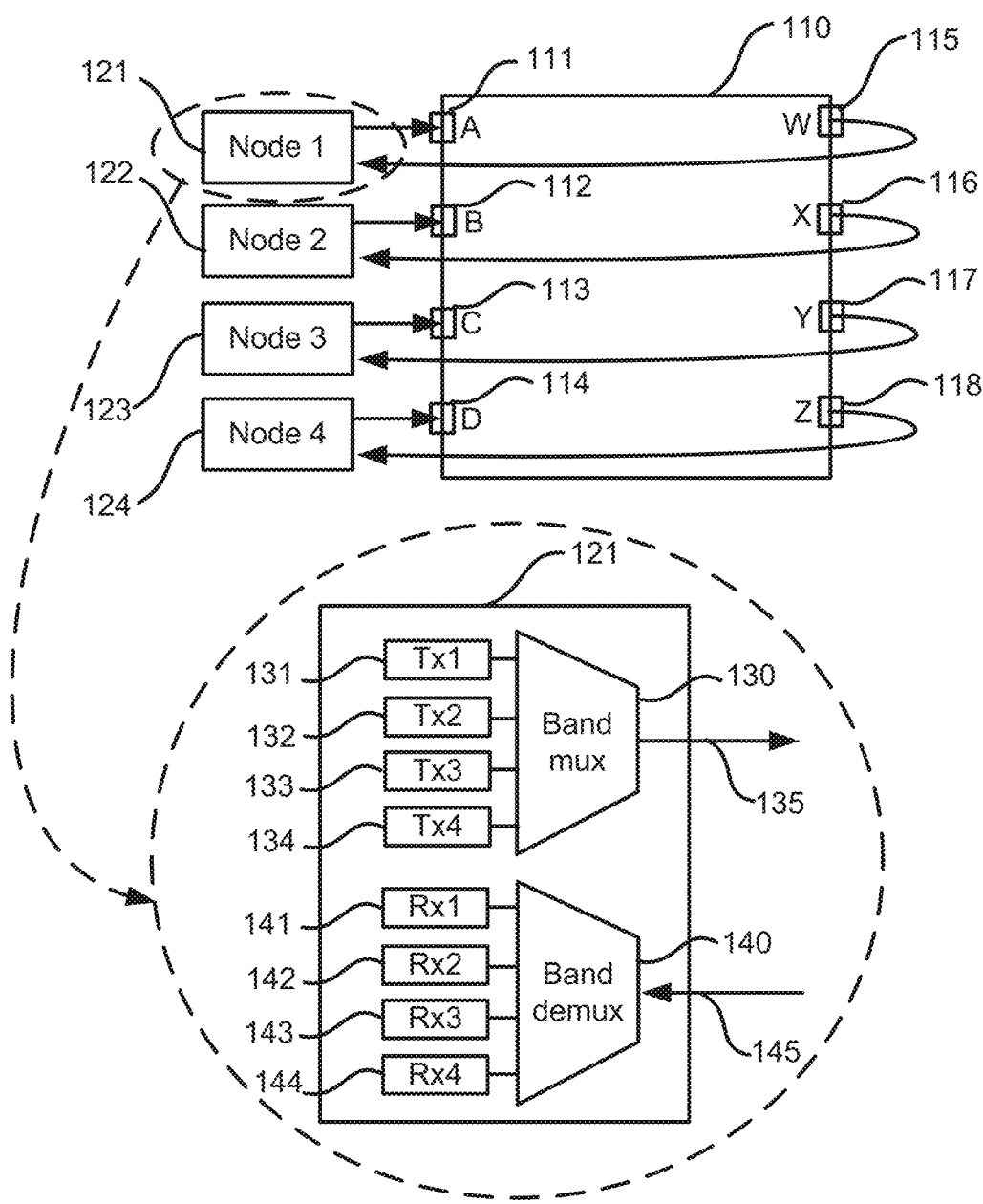
FIG. 1A depicts an example reconfigurable photonic switch.

FIG. 1A depicts an example reconfigurable photonic switch having multiple transceiver nodes 121-124 coupled to the input ports 111-114 and output ports 115-118 of an AWG 110. In the example of FIG. 1A, the AWG 110 has four input ports 111-114 and four output ports 115-118, however, an AWG in a reconfigurable photonic switch may have any number of input ports and any number of output ports. For convenience, the input ports 111-114 of the AWG 110 are labeled A 111, B 112, C 113, and D 114, while the output ports 115-118 are labeled W 115, X 116, Y 117, and Z 118.

Four transceiver nodes 121-124 are shown in the example of FIG. 1A, however, any number of transceiver nodes may be used in the reconfigurable photonic switch. As shown in the inset of FIG. 1A, a transceiver node may include tunable optical transmitters 131-134, receivers 141-144, a band multiplexer 130, and a band demultiplexer 140. While four tunable transmitters 131-134 and four receivers 141-144 are shown in the inset, any number of tunable transmitters and receivers may be used. An electrical input may enter each transmitter 131-134, the optical outputs of the transmitters 131-134 may be multiplexed by the band multiplexer 130, and an output waveguide 135, such as an optical fiber, may exit the band multiplexer 130 carrying the multiplexed signals. An input waveguide 145, such as an optical fiber, may enter the band demultiplexer 140 carrying multiplexed signals in different wavelength bands, the demultiplexed wavelength bands may be sent to different receivers 141-144, and an electrical output may exit each of the receivers 141-144.

The tunable transmitters 131-134 are optical transmitters that emit light at a central wavelength over a narrow band of wavelengths, referred to as a wavelength channel, and the wavelength of the emitted light should be tunable over a range of wavelengths across multiple wavelength channels. In some implementations, the tunable transmitter 131-134 may be a tunable laser, such as a vertical cavity surface emitting laser (VCSEL) or distributed feedback semiconductor laser (DFB), that may be tuned, for example, through the use of a heating element. In some implementations, each tunable transmitter 131-134 located within a single transceiver node 121-124 may emit light in a different wavelength band. In some implementations, each tunable transmitter 131-134 located within a single transceiver node 121-124 may emit light in the same wavelength band. In some implementations, some tunable transmitters 131-134 located within a single transceiver node 121-124 may emit light in overlapping wavelength bands.

Figure 1B:
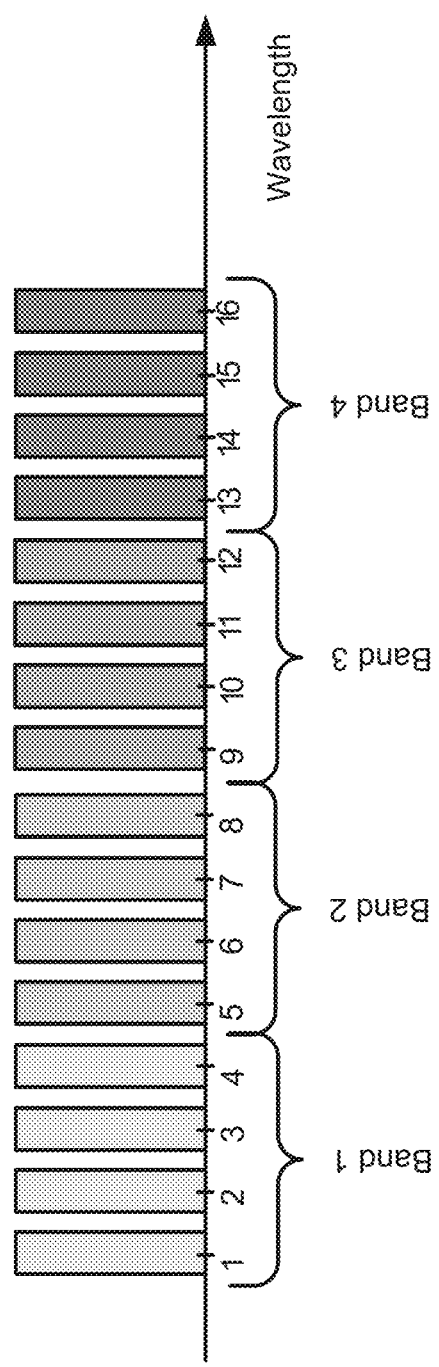
FIG. 1B depicts example wavelength channels and wavelength bands that a transceiver node may transmit and receive.

FIG. 1B depicts example wavelength channels and wavelength bands that a transceiver node 121-124 may transmit and receive. Sixteen evenly spaced wavelength channels, labeled 1 through 16 are shown in the graph, however, in some implementations, some wavelength channels may be skipped. In some implementations, the wavelength channels may coincide with some of the wavelength channels on the wavelength grid specified by the ITU (International Telecommunication Union), where the wavelength channels are spaced by 100 GHz. In FIG. 1B, the first four wavelength channels, labeled 1-4, fall within band 1; the second four wavelength channels, labeled 5-8, fall within band 2; the third four wavelength channels, labeled 9-12, fall within band 3; and the fourth four wavelength channels, labeled 13-16, fall within band 4. In some implementations, the wavelength range spanned by one of the bands may be a FSR of the AWG. In some implementations, the wavelength range spanned by one of the bands may include portions of one or multiple FSRs of the AWG.

Figure 1C:
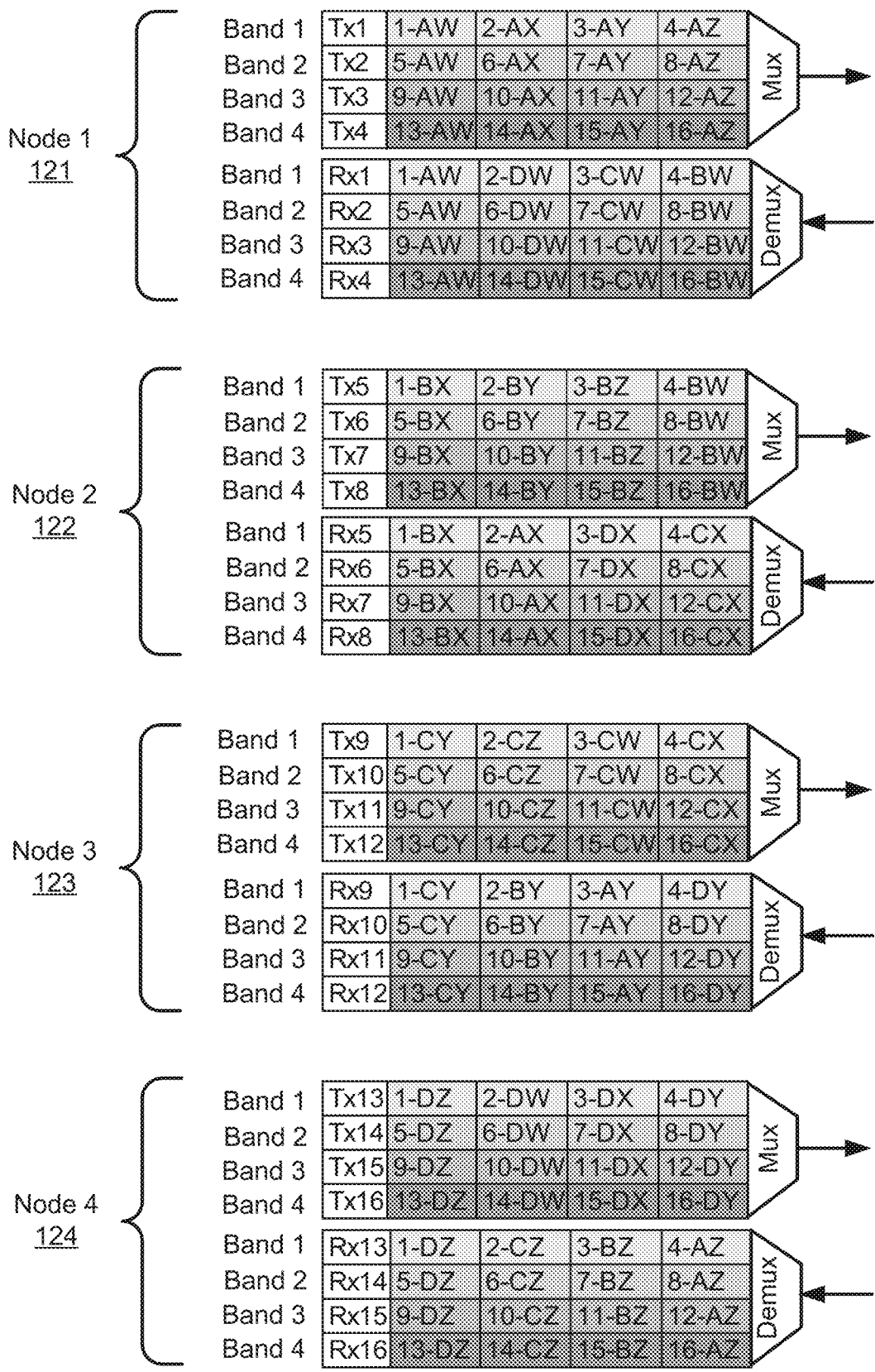
FIG. 1C depicts tables showing example wavelength bands that may be transmitted and received by each of the transceiver nodes.

FIG. 1C depicts tables showing example wavelength bands that may be transmitted and received by each of the transceiver nodes 121-124. In the transmitter tables, transmitters are labeled as Txn, where n is the number of the transmitter, and following each Txn transmitter label is a row of four possible wavelength channels to which the transmitter may be tuned. Each indicated wavelength channel in FIG. 1C is part of an indicator in the format K-MN, where K is the emission wavelength channel (1-16 in this example), M is the input port (A-D in this example) of the AWG to which the transmitter output is coupled, and N is the output port (W-Z in this example) of the AWG to which the transmitter output is routed.

In some examples, for node 1 121, the emission wavelength of transmitter 1 (Tx1) may be tuned to one of the four wavelength channels 1, 2, 3, 4 in band 1, and the output of the transmitter may be coupled to port A 111 of the AWG 110. If the wavelength is tuned to wavelength channel 1, the light may be routed to output port W 115 of the AWG 110, as indicated by '1-AW'; if the wavelength is tuned to wavelength channel 2, the light may be routed to output port X 116 of the AWG 110, as indicated by '2-AX'; if the wavelength is tuned to wavelength channel 3, the light may be routed to output port Y 117 of the AWG 110, as indicated by '3-AY'; and if the wavelength is tuned to wavelength channel 4, the light may be routed to output port A 118 of the AWG 110, as indicated by '4-AZ'. Similarly, in some examples, transmitter 2 (Tx2) may be tuned to one of four wavelength channels 5, 6, 7, 8 in band 2; transmitter 3 (Tx3) may be tuned to one of four wavelength channels 9, 10, 11, 12 in band 3; and transmitter 4 (Tx4) may be tuned to one of four wavelength channels 13, 14, 15, 16 in band 4. The outputs of the four transmitters may be multiplexed by multiplexer (mux) 130 and sent to input port A 111 of the AWG 110.

The transmitters in the other nodes, node 2 122, node 3 123, and node 4 124, may operate similarly, where each of the transmitters may be tuned to one of four wavelength channels. The light emitted by the four transmitters in each node may be multiplexed together using a band multiplexer 130 and sent to a different input node of the AWG. The band multiplexer 130 may multiplex or couple each of the optical outputs from the tunable transmitters 131-134 onto a single output fiber 135. The band multiplexer 130 may be implemented with different technologies, such as thin film filters, fused fibers, and microring resonators. The multiplexed output from node 2 122 may be coupled to input node B 112 of the AWG; the multiplexed output from node 3 123 may be coupled to input node C 113 of the AWG; and the multiplexed output from node 4 124 may be coupled to input node D 114 of the AWG.

If the wavelength range spanned by each of the bands 1, 2, 3, 4 coincides with the FSR of the AWG, wavelength channels 1, 5, 9, 13 are each separated by a FSR, and thus, are routed to the same output port of the AWG when entering the AWG at the same input port. Similarly, if wavelength channels 2, 6, 10, 14 are each separated by a FSR, they are routed to the same output port of the AWG when entering the AWG at the same input port; if wavelength channels 3, 7, 11, 15 are each separated by a FSR, they are routed to the same output port of the AWG when entering the AWG at the same input port; and if wavelength channels 4, 8, 12, 16 are each separated by a FSR, they are routed to the same output port of the AWG when entering the AWG at the same input port.

Returning to node 1 121, a waveguide, such as an optical fiber, couples the output port W 115 of the AWG 110 to a demultiplexer 140 via optical waveguide 145. Demultiplexer 140 separates the light exiting output node W 115 into four bands: light from band 1 may be directed to receiver Rx1, light from band 2 may be directed to receiver Rx2, light from band 3 may be directed to receiver Rx3, and light from band 4 may be directed to receiver Rx4. Similar to multiplexer 130, the demultiplexer 140 may be implemented with different technologies, such as thin film filters, fused fibers, and microring resonators.

FIG. 1C also depicts example receiver tables for each of the transceiver nodes 121-124 in a similar format as for the transmitter tables. In the receiver tables, receivers are labeled as Rxn, where n is the number of the receiver, and following each Rxn receiver label is a row of four possible wavelength channels that the receiver may receive from the demultiplexer. Each wavelength is part of an indicator in the format K-MN, where K is the received wavelength channel (1-16 in this example), M is the input port (A-D in this example) of the AWG from which the light was routed, and N is the output port (W-Z in this example) of the AWG to which the receiver's demultiplexer is coupled.

As indicated in the example receiver table for node 1 121 in FIG. 1C, receiver Rx1 may receive wavelengths in band 1: wavelength channel 1 from input node A 111 of the AWG; wavelength channel 2 from input node D 114 of the AWG; wavelength channel 3 from input node C 113 of the AWG; and wavelength channel 4 from input node B 112 of the AWG. Receiver Rx2 may receive wavelengths in band 2: wavelength channel 5 from input node A 111 of the AWG; wavelength channel 6 from input node 0 114 of the AWG; wavelength channel 7 from input node C 113 of the AWG; and wavelength channel 8 from input node B 112 of the AWG. Receiver Rx3 may receive wavelengths in band 3: wavelength channel 9 from input node A 111 of the AWG; wavelength channel 10 from input node D 114 of the AWG; wavelength channel 11 from input node C 113 of the AWG;

and wavelength channel 12 from input node B 112 of the AWG. Receiver Rx4 may receive wavelengths in band 4: wavelength channel 13 from input node A 111 of the AWG; wavelength channel 14 from input node D 114 of the AWG; wavelength channel 15 from input node C 113 of the AWG; and wavelength channel 16 from input node B 112 of the AWG.

Similarly, in node 2 122, receivers Rx5, Rx6, Rx7, Rx8 may be coupled via a demultiplexer to output port X 116 of the AWG 110; in node 3 123, receivers Rx9, Rx10, Rx11, Rx12 may be coupled via a demultiplexer to output port Y 117 of the AWG 110; and in node 4 124, receivers Rx13, Rx14, Rx15, Rx16 may be coupled via a demultiplexer to output port Z 118 of the AWG 110. Also, receivers Rx5 in node 2 122, Rx9 in node 3 123, and Rx13 in node 4 124 may receive wavelengths in band 1; receivers Rx6 in node 2 122, Rx10 in node 3 123, and Rx14 in node 4 124 may receive wavelengths in band 2; receivers Rx7 in node 2 122, Rx11 in node 3 123, and Rx15 in node 4 124 may receive wavelengths in band 3; and receivers Rx8 in node 2 122, Rx12 in node 3 123, and Rx16 in node 4 124 may receive wavelengths in band 4.

In some implementations, each of receivers Rx1, Rx2, Rx3, Rx4 may be identical and capable of detecting light in any of the wavelength bands 1, 2, 3, 4, for example, a photodetector or a charge-coupled device (CCD).

In some implementations, to reduce the costs of the reconfigurable photonic switch, each transceiver node may include an integrated transceiver, such that the plurality of optical transmitters, the plurality of receivers, the band multiplexer, and the band demultiplexer are integrated on a single die or chip. Examples of suitable die materials include silicon and indium phosphide.

Figure 1D:
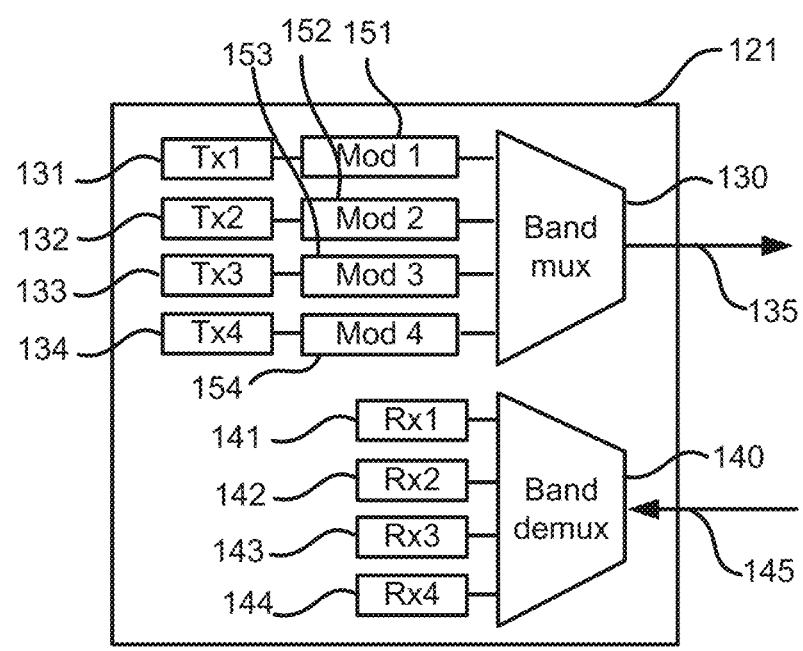
FIG. 1D depicts example components of a transceiver node.

FIG. 1D depicts example components of a transceiver node. In addition to the tunable transmitters 131-134, receivers 141-144, band multiplexer 130, and band demultiplexer 140 described above, a transceiver node may also include modulators 151-154, one modulator for each tunable transmitter. The modulators 151-154 may modulate the emitted light of each of the tunable transmitters 131-134, where the modulation of the output of the transmitters is the data to be transmitted from the transceiver node to a different transceiver node. Examples of modulators 151-154 may include a direct modulator that modulates the current driving the tunable transmitter 131-134 or an external optical modulator, such as a Mach-Zehnder modulator, an electro-absorption modulator that modifies the absorption of a semiconductor material when an external electric field is applied, or an electro-optic modulator that modifies the refractive index of a material under the application of an external electric field and is used in conjunction with an interferometric structure.

Figure 2A:
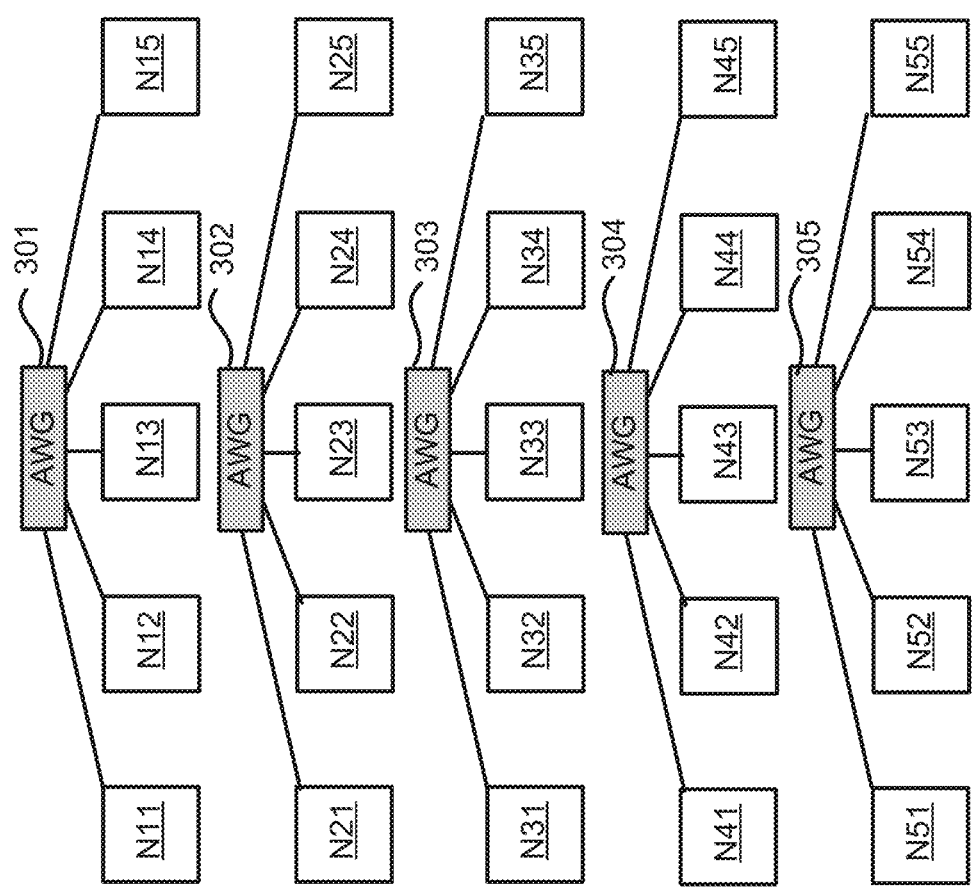
FIGS. 2A-2B show an example two-dimensional configuration of interconnected nodes.
Figure 2B:
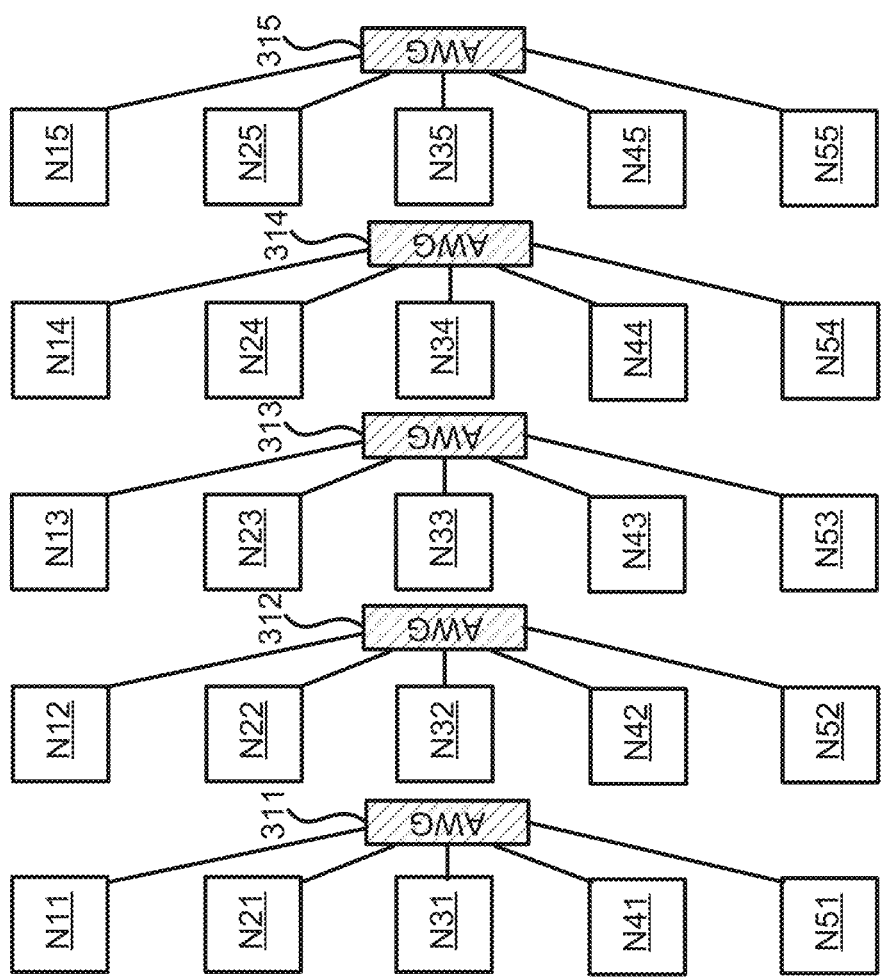

FIGS. 2A-2B show an example two-dimensional 5×5 configuration of interconnected nodes reconfigurable via wavelength switching, where each node is connected to two AWGs. In the example of FIG. 2A, there are 25 nodes, N11-N55, shown in a five-by-five array. Note that the number of nodes in each dimension may be greater than or less than five. Each node N11-N55 may be a transceiver node, similar to the transceiver node shown in the example of FIG. 1D, except with five transmitters, modulators, and receivers, rather than four, to allow communication with five nodes via a routing AWG, and the transmitters are each tunable over five wavelength channels.

Each row of five nodes is connected via two optical fibers, an input optical fiber and an output optical fiber, to a different AWG 301-305. For clarity, each line connecting a node to an AWG represents these two fibers. Nodes N11-N15 are connected to AWG 301; nodes N21-N25 are connected to AWG 302; nodes N31-N35 are connected to AWG 303; nodes N41-N45 are connected to AWG 304; and nodes N51-N55 are connected to AWG 305. Each node may communicate to a connected AWG using one of five different wavelength channels. Each AWG 301-305 has five input ports and five output ports. Thus, the nodes in the horizontal dimension are optically interconnected in a mesh.

Additionally, each column of five nodes are also connected via two additional optical fibers, an input optical fiber and an output optical fiber, to a different AWG 311-315, as shown in FIG. 2B. Again, for clarity, each line in FIG. 2B connecting a node to an AWG represents these two fibers. Nodes N11-N51 are connected to AWG 311; nodes N12-N52 are connected to AWG 312; nodes N13-N53 are connected to AWG 313; nodes N14-N54 are connected to AWG 314; and nodes N15-N55 are connected to AWG 315. Each node may communicate to a connected AWG using one of five different wavelength channels. Each AWG 311-315 has five input ports and five output ports. As a result, the nodes in the vertical dimension are also optically interconnected in a mesh.

FIGS. 2A and 2B together show all the AWGs in the system and their connections to the same 25 nodes N11-N55. For clarity, AWGs 301-305 are shown in FIG. 2A, while AWGs 311-315 are shown separately in FIG. 2B. However, nodes N11-N55 are simultaneously connected to AWGs 301-305 and AWGs 311-315. While nodes N11-N55 are shown in a five-by-five array, the nodes may be in different physical locations. For example, the nodes may be scattered around a data center, and the AWGs may be located in a central location in the data center. In this case, the fibers from the nodes connect to the AWGs at the central location, similar to a star-type network.

A first node, for example N11, may communicate via a second node, for example N51, with a third node, for example, N55. Thus, N11 transmits a signal at an appropriate wavelength channel for the AWG 311 to route the signal to N51. Then N51 transmits the signal at an appropriate wavelength channel for AWG 305 to route the signal to N55. To communicate from a node in a first dimension to a node in a second dimension, one electrical conversion of the signal occurs at the intermediate second node.

A system of nodes that has tunable wavelength transmitters and are interconnected via AWGs may be able to provide multiple paths between nodes. For example, as discussed above, node N11 may communicate with node N55 via node N51. However, if N51 were to fail, the system is resilient. Node N11 may still communicate with node N55 via node N15 by changing the transmission wavelength channel of the signal emitted from node N11 such that the signal is re-routed by AWG 301 to node N15. In this case, there is still a single electrical conversion of the signal at the intermediate node N15.

Figure 2C:
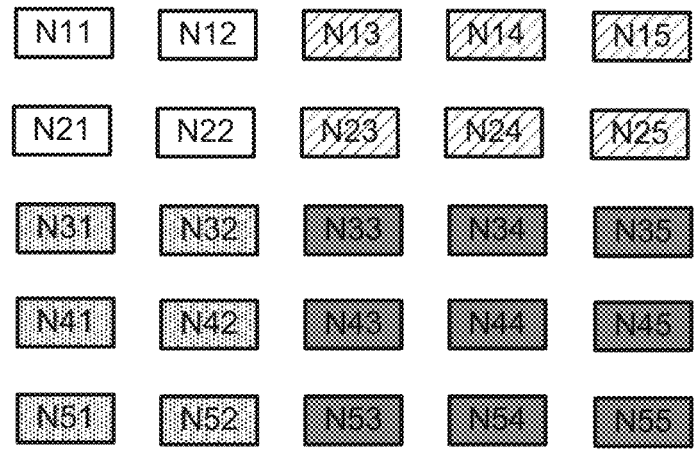
FIGS. 2C-2D show different examples of interconnected domains that can be independently configured.
Figure 2D:
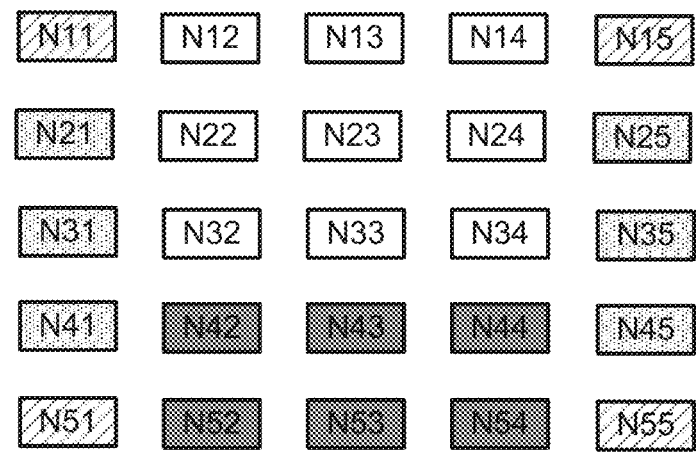

FIGS. 2C-2D show different examples of interconnected domains in a two-dimensional (5×5) configuration of interconnected nodes, where each domain can be independently configured using wavelength switching. A domain may be a group of nodes reserved for communications for a single entity, such as a customer, enterprise, or business. With the wavelength switching techniques described above, it may be possible to physically share a data center, for example, one that supports cloud applications for different entities, while maintaining security of the data within the domain of each entity sharing the data center. With other types of shared data centers, two or more entities may share a node within a data center, and privacy of the data is based upon data encryption. In this scenario, if an entity receives a packet with the wrong encryption, the entity discards the packet. However, receiving the wrong encrypted data packet provides an opportunity for hackers to access the data. In contrast, with nodes and domains in a data center dedicated to an entity, as described in this disclosure, specific wavelength channels are used to communicate among the nodes within a domain, and data packets are no longer permitted to be routed to a node associated with the wrong entity. This adds a layer of protection beyond just encrypting the data, which can result in data packets that are misrouted to an unintended recipient.

Additionally, different domains may be useful for different software application problems or work flows. For example, some problems may make use of a large bandwidth between a small number of nodes, while other problems may use a large number of nodes with a smaller bandwidth between nodes. Bandwidth may be flexibly assigned to different nodes and different numbers of nodes using wavelength switching and AWGs.

In the example of FIG. 20, four domains are shown. A first domain has nodes N11, N12, N21, and N22; a second domain has nodes N13, N14, N15, N23, N24, and N25; a third domain has nodes N31, N32, N41, N42, N51, and N52; and a fourth domain has nodes N33, N34, N35, N43, N44, N45, N53, N54, and N55. Each domain has multiple paths between any two nodes in the domain in a different dimension, thus providing resilience for the network. For example, for the second domain, node N13 may communicate with node N24 via either node N14 or node N23.

In the example of FIG. 2D, a different set of four domains is shown. A first domain has nodes N11, N15, N51, and N55; a second domain has nodes N12, N13, N14, N22, N23, N24, N32, N33, and N34; a third domain has nodes N21, N25, N31, N35, N41, and N45; and a fourth domain has nodes N42, N43, N44, N52, N53, and N54. Again, each domain has multiple paths between any two nodes in the domain in a different dimension. Note that because the nodes may be physically located anywhere in a data center, the nodes within a domain do not need to be adjacent. For example, for the first domain, node N11 may communicate with node N55 via either node N15 or node N51.

Figure 3A:
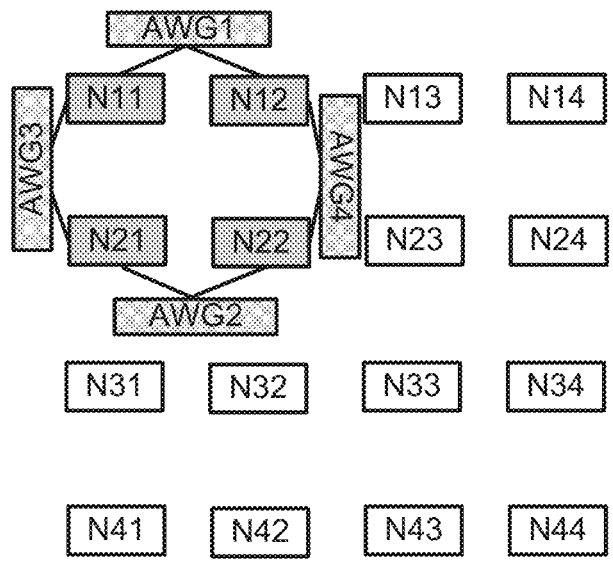
FIGS. 3A-3B show an example pay-as-you-grow configuration of nodes.
Figure 3B:
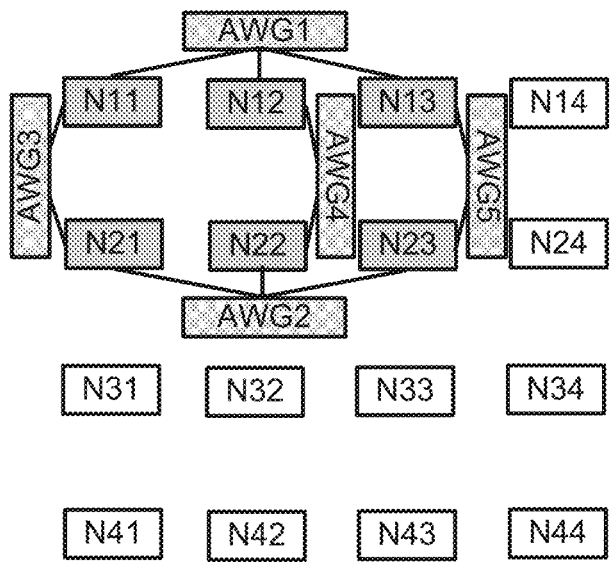

FIGS. 3A-3B show an example pay-as-you-grow configuration of interconnected nodes. In a data center, passive network components, such as the optical fibers and the AWGs, are less expensive components, while the hardware at a node, such as transmitters, receivers, and modulators, are more expensive components. In some implementations, an entity may not want to pay for the hardware at more nodes than are currently needed or expected to be needed in the near future. A system of reconfigurable interconnected nodes via wavelength switching is suited to support a pay-as-you-grow network. For example, in a two-dimensional 4×4 configuration of nodes connected using wavelength switching, the passive network elements that are less expensive may be initially installed, as well as the hardware for four of the nodes, N11, N12, N21, N22, as indicated in FIG. 3A. The hardware in the remaining nodes of the network may not be installed to save expenses.

In a first dimension (rows of the 4×4 configuration), nodes N11 and N12 are connected to AWG1, and nodes N21 and N22 are connected to AWG2. In a second dimension (columns of the 4×4 configuration), nodes N11 and N21 are connected to AWG3, and nodes N12 and N22 are connected to AWG4. The transmitters at the nodes are tunable over four wavelength channels (to support the 4×4 configuration), and the node has a set of four transmitters, four modulators, four receivers, a band multiplexer, and a band demultiplexer, as shown in FIG. 10, for each dimension of the network. In this case, the network has a dimension of two, with each node being connected to two AWGs, so each node has two sets of the hardware. Each node may be operated at full bandwidth capacity, for example, if the hardware can modulate a signal up to 25 GHz, then 25 GHz signals at each of the four wavelength channels provides a total of 100 GHz bandwidth transmission capacity at each node to communicate with the other node connected to the same AWG. Thus, for example, node N11 may communicate at 100 GHz bandwidth to node N12, and N11 may also communicate at 100 GHz bandwidth to node N21.

In the example of FIG. 3B, the hardware for two additional nodes N13, N23 have been added. Each of these nodes also has two sets of hardware, four transmitters, four modulators, four receivers, a band multiplexer, and a band demultiplexer. Node N13 is connected to nodes N11 and N12 via AWG1; node N23 is connected to nodes N21 and N22 via AWG2; and nodes N13 and N23 are connected via AWG5. In this 2×3 configuration, the four wavelength channels at which each node communicates may be provisioned in any manner between nodes. For example, the four wavelength channels providing 100 GHz bandwidth from node N11 may be split so that two wavelength channels at 25 GHz each may be routed by AWG1 to node N12, and the remaining two wavelength channels at 25 GHz each may be routed by AWG1 to node N13. In another example, three wavelength channels at 25 GHz may be routed by AWG1 to node N12, and the remaining wavelength channel at 25 GHz may be routed by the AWG1 to node N13. The distribution of bandwidth by the other AWGs may also be provisioned in a similar manner, as desired.

The remaining nodes in the 4×4 configuration may be added as the entity grows. Alternatively or additionally, some of the other nodes may be used by another entity in a separate domain.

Figure 4:
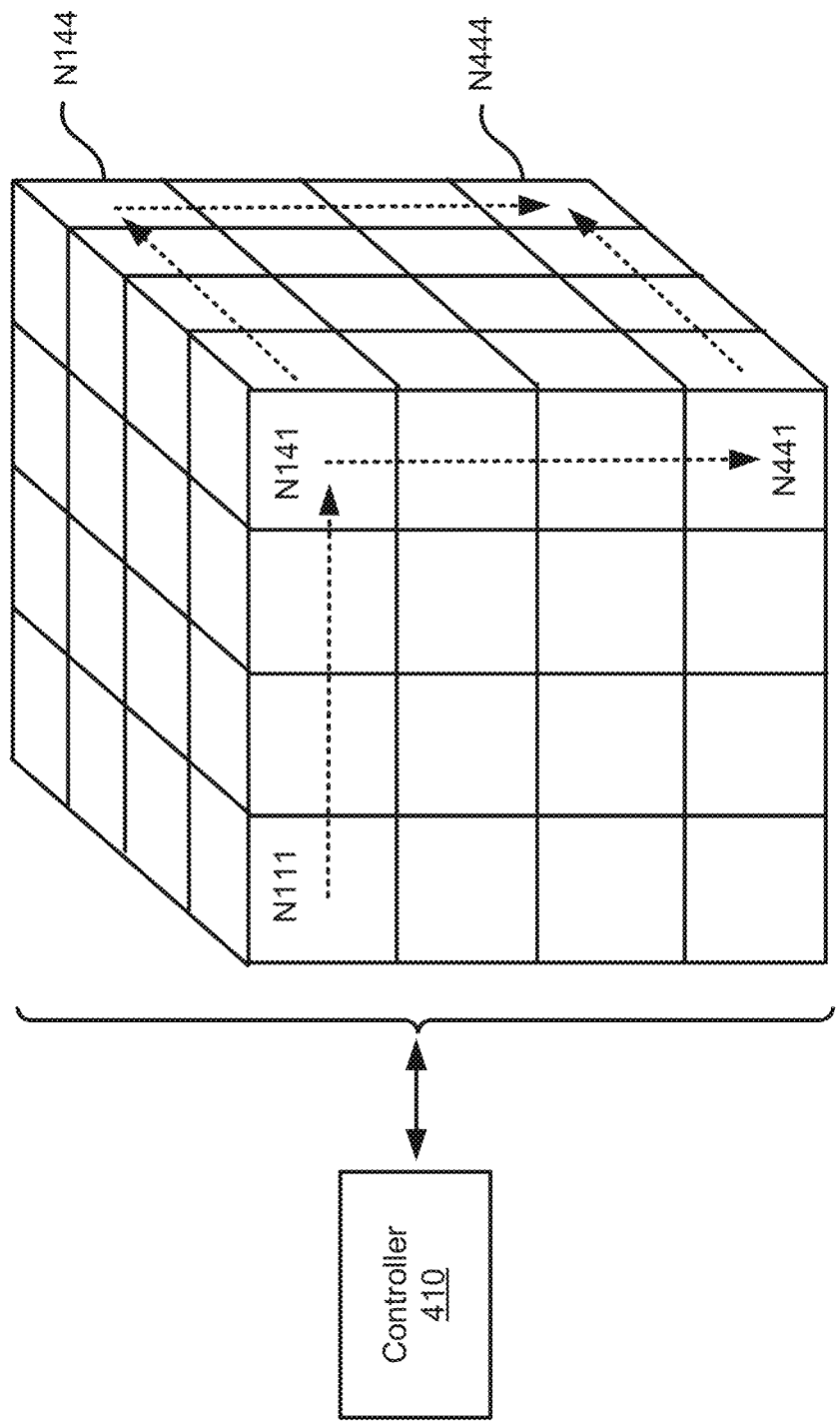
FIG. 4 shows an example three-dimensional configuration of interconnected nodes.

The above examples show a two-dimensional configuration where each node is coupled to two AWGs, one in each dimension. The number of dimensions is not limited to two; any number of dimensions may be implemented. In the example of FIG. 4, a three-dimensional configuration of nodes interconnected using wavelength switching is depicted. In a three-dimensional configuration, each node is connected to three different AWGs, one in each dimension. The number of nodes in each dimension determines the number of wavelength channels each tunable transmitter should be able to emit. Further, each node should have a set of hardware for each dimension. Specifically, the hardware should include: a plurality of optical transmitters, where each optical transmitter is tunable over multiple wavelength channels within a different wavelength band; a band multiplexer to multiplex the multiple wavelength channels within each different wavelength band; a band demultiplexer to demultplex the multiple wavelength channels within each different wavelength band; a plurality of receivers to receive wavelengths of light within the different wavelength bands from the band demultiplexer. For each node, there is an output fiber coupled to an output of each band multiplexer and coupled to one of the input ports of an AWG in each dimension, and there is an input fiber coupled to an input to the band demultiplexer and coupled to one of the output ports of an AWG in each dimension.

With a 4×4×4 configuration of nodes, a total of 64 nodes may be interconnected using only four wavelength channels being emitted from each node and three connections from each node, one connection to an AWG in each dimension. As an example, for a 4×4×4 system, node N111 may communicate with node N444 via nodes N141 and N441. In this case, with three dimensions, two electrical conversions are used in the communications between nodes N111 and N444. The system also provides multiple paths between nodes for resilience. For example, N11 may communicate with node N444 via nodes N141 and N144.

In some implementations, two or more parallel systems of the 4×4×4 system shown in FIG. 4 may be used to increase the bandwidth capacity to and from each node. For example, node N111 may communicate with node N141 using a single wavelength channel at 25 GHz bandwidth in a first 4×4×4 system, and node N111 may communicate with node 141 using a single wavelength channel at 25 GHz in a second 4×4×4 system, thus providing a total of 50 GHz bandwidth between nodes N111 and N141. While the example of parallel systems of 4×4×4 interconnected nodes is described, two or more parallel systems may be used for any size system of interconnected nodes to provide additional bandwidth between nodes. With parallel systems, each node may be coupled to a different AWG in a given dimension for each parallel system. For example, with three parallel 4×4×4 systems, a node may be coupled to three different AWGs in a first dimension, three different AWGs in a second dimension, and three different AWGs in a third dimension, for a total of nine connections to AWGs for each node.

A controller 410 may be used to tune the emission wavelength channel of the tunable transmitters in the nodes N111-N444. The controller 410 may be a single controller or a distributed controller. The tunable transmitters may be tuned by the controller to the particular emission wavelength channel that will cause the corresponding AWG to which a node is connected to route the signal to the appropriate output port to be addressed. In some implementations, the controller 410 may use a look-up table that provides a corresponding output port for each emission wavelength channel, and each transmitter has its own look-up table. Further, by controlling the emission wavelength channel of each of the optical transmitters in the transceiver nodes, the controller 410 may prevent collisions from occurring within the system of nodes by ensuring that emission wavelength channels of two different optical transmitters are not transmitted simultaneously to a same receiver via the AWGs. A controller may be used for any size reconfigurable system of interconnected nodes to control the wavelength channels transmitted by the nodes.

In some implementations, system of interconnected nodes reconfigurable via wavelength switching includes a plurality of arrayed waveguide gratings (AWG) having a plurality of input ports and a plurality of output ports, wherein a signal within a given wavelength channel transmitted to one of the input ports of a given AWG is routed to one of the output ports of the given AWG based on a signal wavelength. The system also includes a plurality of nodes, each node including a set of components for each AWG that the node is coupled to. Each set of components includes a plurality of optical transmitters, where each optical transmitter is tunable over multiple wavelength channels within a different wavelength band; a band multiplexer to multiplex the multiple wavelength channels within each different wavelength band; and a first output fiber to couple an output of the band multiplexer to one of the input ports of a first AWG. Each set of components can also include a plurality of receivers to receive wavelengths of light within the different wavelength bands; a band demultiplexer to demultplex the multiple wavelength channels within each different wavelength band; and a first input fiber to couple one of the output ports of the first AWG to an input of the band demultiplexer.

In some implementations, each set of components of each node includes an integrated transceiver, such that the plurality of optical transmitters, the plurality of receivers, the band multiplexer, and the band demultiplexer are integrated on a single die. In some implementations, each set of components of each node may include a plurality of modulators, one modulator for each of the plurality of optical transmitters to modulate light emitted by the optical transmitters. In some examples, each of the optical transmitters of the plurality of nodes is further tunable over the different wavelength bands, and the band multiplexer and band demultiplexer are tunable.

In some implementations, the system of interconnected nodes may also include a controller to control an emission wavelength channel of each of the optical transmitters in the plurality of nodes such that emission wavelength channels of two different optical transmitters are not transmitted simultaneously to a same receiver via the plurality of AWGs.

Figure 5:
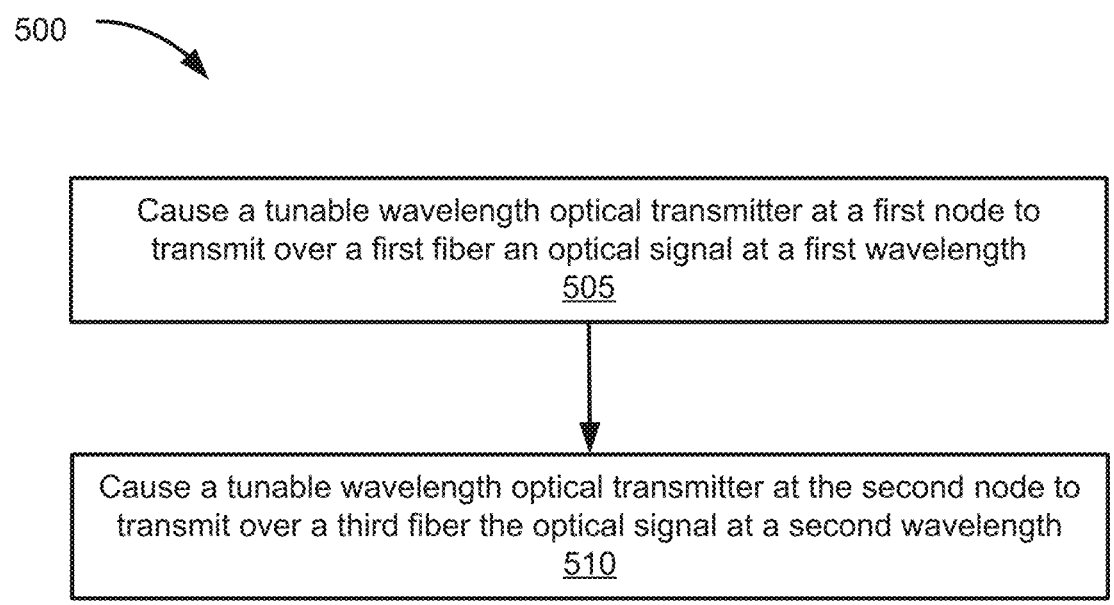
FIG. 5 depicts a flow diagram illustrating an example process of providing connectivity among nodes.

FIG. 5 depicts a flow diagram illustrating an example process 500 of providing connectivity between nodes. At block 505, a tunable wavelength optical transmitter at a first node may be caused to transmit over a first fiber an optical signal at a first wavelength channel. The first fiber is coupled to an input port of a plurality of input ports of a first arrayed waveguide grating (AWG), and the signal is routed to a first output port of a plurality of output ports of the first AWG based on the first wavelength channel and is transmitted over a second fiber to a second node.

At block 510, a tunable wavelength optical transmitter at the second node may be caused to transmit over a third fiber the optical signal at a second wavelength channel. The third fiber is coupled an input port of a plurality of input ports of a second AWG, and the signal is routed to a first output port of a plurality of output ports of the second AWG based on the second wavelength channel and is transmitted over a fourth fiber to a third node.

Figure 6A:
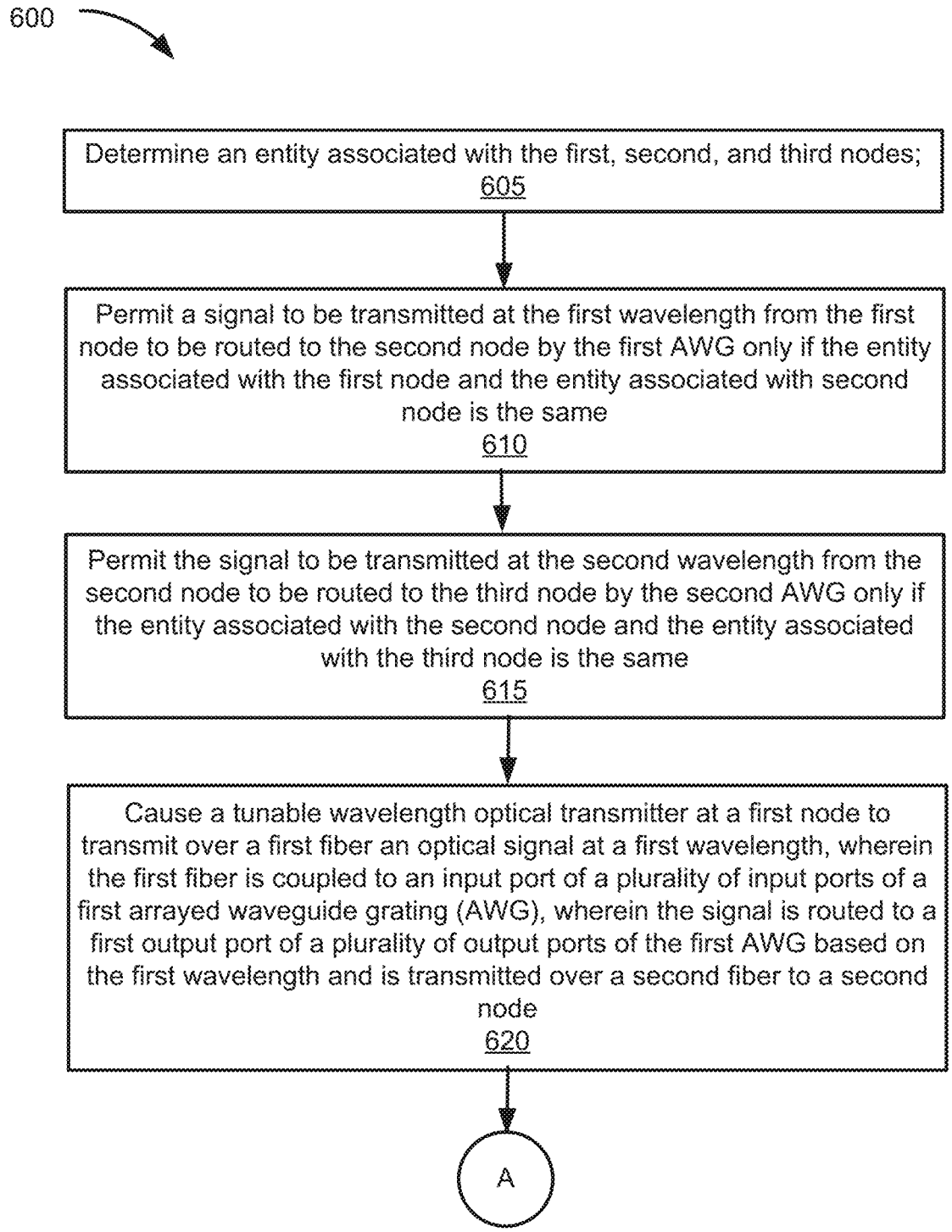
FIGS. 6A-6B depict a flow diagram illustrating another example process of providing connectivity among nodes.
Figure 6B:
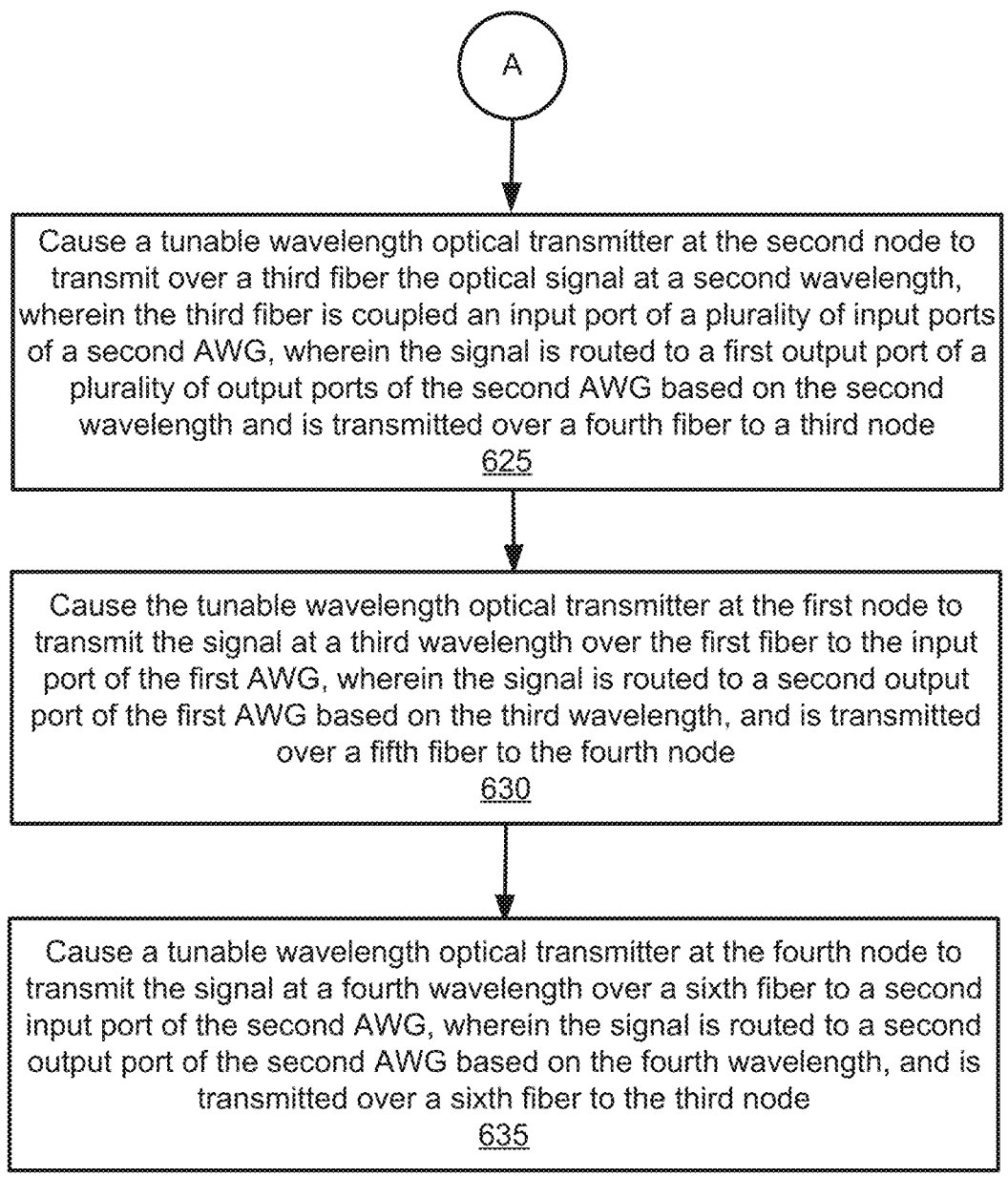

FIGS. 6A-6B depict a flow diagram illustrating another example process of providing connectivity between nodes.

In some implementations, a first node and a second node may be part of a first set of nodes, and a second node and a third node may be part of a second set of nodes. Each node of the first set of nodes includes a plurality of optical transmitters, wherein each optical transmitter is tunable over multiple wavelength channels within a different wavelength band; a band multiplexer to multiplex the multiple wavelength channels within each different wavelength band; a band demultiplexer to demultplex the multiple wavelength channels within each different wavelength band; a plurality of receivers to receive wavelengths of light within the different wavelength bands from the band demultiplexer; an output fiber coupled to an output of the band multiplexer and coupled to one of the input ports of the first AWG; and an input fiber coupled to an input to the band demultiplexer and coupled to one of the output ports of the first AWG.

Each node of the second set of nodes includes a plurality of optical transmitters, wherein each optical transmitter is tunable over multiple wavelength channels within a different wavelength band; a band multiplexer to multiplex the multiple wavelength channels within each different wavelength band; a band demultiplexer to demultplex the multiple wavelength channels within each different wavelength band; a plurality of receivers to receive wavelengths of light within the different wavelength bands from the band demultiplexer; an output fiber coupled to an output of the band multiplexer and coupled to one of the input ports of the second AWG;

and an input fiber coupled to an input to the band demultiplexer and coupled to one of the output ports of the second AWG.

At block 605, an entity associated with the first, second, and third node may be determined. For example, it may be determined that the first, second, and third nodes serve the communication needs of a single entity or customer.

At block 610, the signal at the first wavelength channel may be permitted to be transmitted from the first node to be routed to the second node by the first AWG if the entity associated with the first node and the entity associated with second node is the same. That is, if the entity or customer served by the first node and the second node are different, then communication from the first node to the second node is not permitted.

At block 615, the signal at the second wavelength channel may be permitted to be transmitted from the second node to be routed to the third node by the second AWG only if the entity associated with the second node and the entity associated with the third node is the same. That is, if the entity or customer served by the second node and the third node are different, then communication from the second node to the third node is not permitted. Blocks 610 and 615 are a security measure to prevent information from being sent to the wrong destination and potentially intercepted by an unintended recipient.

Assuming that the first node and the second node are associated with the same entity, at block 620, a tunable wavelength optical transmitter at the first node may be caused to transmit over a first fiber an optical signal at a first wavelength channel. The first fiber is coupled to an input port of a plurality of input ports of a first arrayed waveguide grating (AWG), and the signal is routed to a first output port of a plurality of output ports of the first AWG based on the first wavelength channel and is transmitted over a second fiber to a second node.

Assuming that the second node and the third node are associated with the same entity, at block 625, a tunable wavelength optical transmitter at the second node may be caused to transmit over a third fiber the optical signal at a second wavelength channel. The third fiber is coupled an input port of a plurality of input ports of a second AWG, and the signal is routed to a first output port of a plurality of output ports of the second AWG based on the second wavelength channel and is transmitted over a fourth fiber to a third node.

In one example, the signal may be rerouted from the first node via a fourth node to the third node and bypass the second node. For example, the second node may have developed a failure, or the second node may be shut down to save power. In this case, at block 630, the tunable wavelength optical transmitter at the first node may be caused to transmit the signal at a third wavelength channel over the first fiber to the input port of the first AWG. The signal is routed to a second output port of the first AWG based on the third wavelength channel, and is transmitted over a fifth fiber to the fourth node.

At block 635, a tunable wavelength optical transmitter at the fourth node may be caused to transmit the signal at a fourth wavelength channel over a sixth fiber to a second input port of the second AWG. The signal is routed to a second output port of the second AWG based on the fourth wavelength channel, and is transmitted over a sixth fiber to the third node. In some implementations, the multiple wavelength channels comprises a first set of wavelength channels and a second set of wavelength channels, wherein the first set of wavelength channels and the second set of wavelength channels are distinct, and further wherein the first set of wavelength channels received by the first AWG from the first node is directed to the second node, and the second set of wavelength channels received by the first AWG from the first node is directed to the fourth node.

In some implementations, the multiple wavelength channels comprises a first set of wavelength channels and a second set of wavelength channels. The first set of wavelength channels and the second set of wavelength channels are distinct, and the first set of wavelength channels received by the first AWG from the first node is directed to the second node, and the second set of wavelength channels received by the first AWG from the first node is directed to the fourth node.

Figure 7:
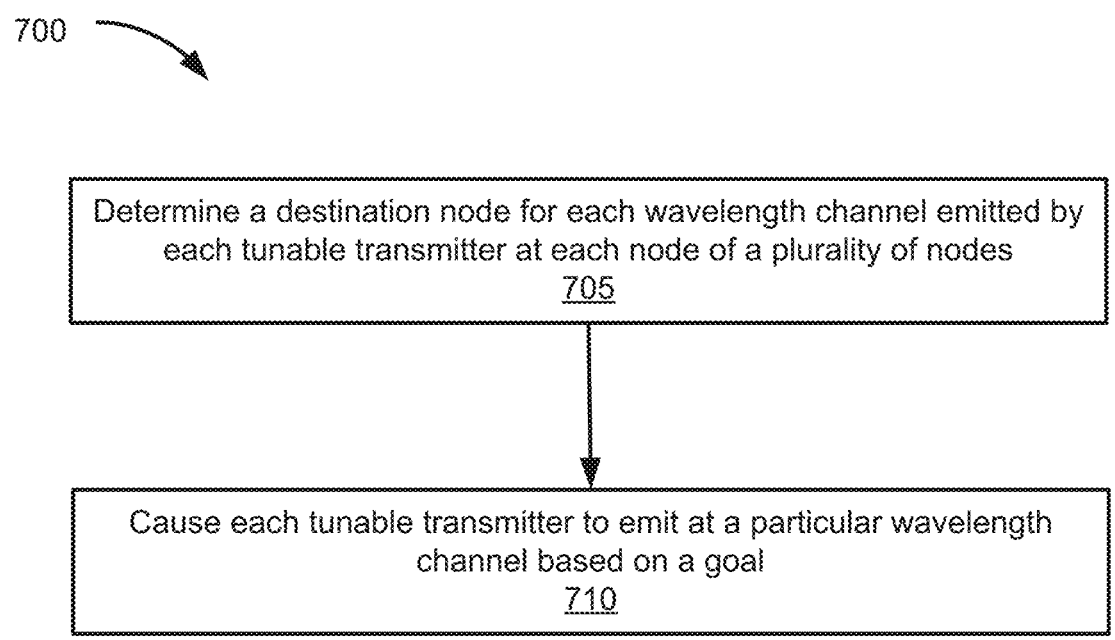
FIG. 7 depicts a flow diagram illustrating an example process of reconfiguring interconnectivity of nodes.

FIG. 7 depicts a flow diagram illustrating an example process of reconfiguring interconnectivity of a plurality of nodes coupled to a plurality of AWGs. Each node has a first and second output fiber, and each first output fiber of each node is coupled to a different input port of a first set of arrayed waveguide gratings (AWG), and each second output fiber of each node is coupled to a different output port of a second set of AWGs.

Further, each node includes a set of components for each AWG that the node is coupled to. Additionally, each set of components includes a plurality of optical transmitters, where each optical transmitter is tunable over multiple wavelength channels within a different wavelength band; a band multiplexer to multiplex the multiple wavelength channels within each different wavelength band; a first output fiber to couple an output of the band multiplexer to one of the input ports of an AWG of the first set of AWGs; a band demultiplexer to demultiplex the multiple wavelength channels within each different wavelength band; a plurality of receivers to receive wavelengths of light within the different wavelength bands; and a first input fiber to couple one of the output ports of an AWG of the second set of AWGs the first AWG to an input of the band demultiplexer.

At block 705, a destination node for each wavelength channel emitted by each tunable transmitter may be determined by a controller for each node of the plurality of nodes.

At block 710, each tunable transmitter may be caused by a controller to emit at a particular wavelength channel based on a goal.

In some implementations, the goal may be to save power by shutting down unneeded nodes and re-routing traffic from the unneeded nodes to other nodes. In this case, causing each tunable transmitter to emit at a particular wavelength channel based on the goal may include causing each tunable transmitter to emit at wavelength channels that are not routed by the plurality of AWGs to the unneeded nodes, and causing each tunable transmitter at the unneeded nodes to stop emitting.

In some implementations, the goal may be to re-route traffic around a failed node through other operative nodes. In this case, causing each tunable transmitter to emit at a particular wavelength channel based on the goal may include causing each tunable transmitter to emit at wavelength channels that are not routed by the plurality of AWGs to the failed node.

In some implementations, the goal may be to activate previously unused nodes to permit additional traffic to be routed to the previously unused nodes. In this case, causing each tunable transmitter to emit at a particular wavelength channel based on the goal may include permitting each tunable transmitter to emit at wavelength channels that are routed by the plurality of AWGs to the previously unused nodes.

Not all of the steps, or features presented above are used in each implementation of the presented techniques. Further, steps in processes may performed in a different order than presented.

As used in the specification and claims herein, the singular forms "a," "an," and "the" include plural referents unless the context clearly dictates otherwise.

What is claimed is:

1. A system of interconnected nodes reconfigurable via wavelength switching comprising:
    a first arrayed waveguide grating (AWG) of a plurality of AWGs having a first plurality of input ports and a first plurality of output ports, wherein a first signal within a first wavelength channel transmitted to a first port of the first plurality of input ports is routed to a first port of the first plurality of output ports based on a first signal wavelength;
    a second AWG of the plurality of AWGs having a second plurality of input ports and a second plurality of output ports, wherein a second signal within a second wavelength channel transmitted to a second port of the second plurality of input ports is routed to a second port of the second plurality of output ports based on a second signal wavelength; and
    a plurality of transceiver nodes, wherein a transceiver node of the plurality of transceiver nodes comprises a set of components for the first AWG and for the second AWG that the transceiver node is coupled to, wherein each set of components comprises:
        a plurality of optical transmitters, wherein each optical transmitter is tunable over multiple wavelength channels to a plurality of wavelength bands;
        a band multiplexer to multiplex the multiple wavelength channels within the plurality of wavelength bands;
        an output fiber to couple an output of the band multiplexer to the first port of the first plurality of input ports or the second port of the second plurality of input ports;
        a band demultiplexer to demultiplex the multiple wavelength channels within the plurality of wavelength bands; and
        an input fiber to couple an input of a band demultiplexer to the first port of the first plurality of output ports or the second port of the second plurality of output ports,
    wherein the transceiver node is simultaneously and optically connected in a mesh to the first AWG and the second AWG using the first signal wavelength corresponding with the first AWG and the second signal wavelength corresponding with the second AWG.

2. The system of claim 1, wherein the set of components further comprises:
    a plurality of receivers to receive wavelengths of light within the plurality of wavelength bands.

3. The system of claim 1, wherein the set of components of each transceiver node are integrated on a single die.

4. The system of claim 1, further comprising a controller to control an emission wavelength channel of each of the plurality of optical transmitters in the plurality of nodes such that emission wavelength channels of two different optical transmitters are not transmitted simultaneously to a same receiver via the plurality of AWGs.

5. The system of claim 1, wherein the set of components of each transceiver node further comprises a plurality of modulators, one modulator for each of the plurality of optical transmitters to modulate light emitted by the optical transmitters.

6. The system of claim 1, wherein the first AWG and the second AWG are located at a central location in a star-type network.

7. The system of claim 1, further comprising:
    a controller, wherein the controller determines a wavelength and a destination of the plurality of AWGs for signal transmissions.

8. The system of claim 1, wherein the transceiver node of the plurality of transceiver nodes emits light in overlapping wavelength bands.

9. The system of claim 1, wherein the system implements an electrical conversion of a signal transmission between the transceiver node of the plurality of transceiver nodes to a second transceiver node of the plurality of transceiver nodes, and wherein the transceiver node and the second transceiver node are in different dimensions.

10. The system of claim 9, wherein the electrical conversion of the signal transmission occurs at an intermediate transceiver node of the plurality of transceiver nodes.

* * * * *